US008426337B2

(12) United States Patent
Yang et al.

(10) Patent No.: US 8,426,337 B2
(45) Date of Patent: Apr. 23, 2013

(54) METAL SALT CATALYSTS FOR ENHANCING HYDROGEN SPILLOVER

(75) Inventors: Ralph T. Yang, Ann Arbor, MI (US); Yuhe Wang, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 805 days.

(21) Appl. No.: 12/392,421

(22) Filed: Feb. 25, 2009

(65) Prior Publication Data

US 2013/0045867 A1    Feb. 21, 2013

Related U.S. Application Data

(63) Continuation-in-part of application No. 11/442,898, filed on May 30, 2006.

(60) Provisional application No. 60/725,337, filed on Oct. 11, 2005, provisional application No. 60/751,744, filed on Dec. 19, 2005.

(51) Int. Cl.
    *C01B 31/08* (2006.01)

(52) U.S. Cl.
    USPC .......................................... 502/417

(58) Field of Classification Search ................ 502/417
    See application file for complete search history.

(56) References Cited

U.S. PATENT DOCUMENTS

| 3,948,804 | A | * | 4/1976 | Rausch ......................... 502/227 |
| 5,102,745 | A | | 4/1992 | Tatarchuk et al. |
| 6,596,055 | B2 | | 7/2003 | Cooper et al. |
| 6,930,193 | B2 | | 8/2005 | Yaghi et al. |

OTHER PUBLICATIONS

Dillon, et al., "Storage of Hydrogen in Single-Walled Carbon Nanotubes", Nature, vol. 386, Mar. 27, 1997, pp. 377-379.
Ye, et al., "Hydrogen Adsorption and Cohesive Energy of Single-Walled Carbon Nanotubes", Applied Physics Letters, vol. 74, No. 16, Apr. 19, 1999, pp. 2307-2309.
Wang et al., "Computer Simulations of Hydrogen Adsorption on Graphite Nanofibers", Journal of Physical Chemistry B, vol. 103, No. 2, Jan. 14, 1999, pp. 277-281.
Liu, et al., "Hydrogen Storage in Single-Walled Carbon Nanotubes at Room Temperature", Science, vol. 286, Nov. 5, 1999, pp. 1127-1129.
Chen, et al., "High H2 Uptake by Alkali-Doped Carbon Nanotubes Under Ambient Pressure and Moderate Temperatures", Science, vol. 285, Jul. 2, 1999, pp. 91-93.
Yang, Ralph T., "Hydrogen Storage by Alkali-Doped Carbon Nanotubes—Revisited", Carbon, 38 (2000), pp. 623-626.
Dillon, et al., "Hydrogen Storage Using Carbon Adsorbents: Past, Present and Future", Appl. Phys. A 72 (2001), pp. 133-142.
Tibbetts, et al., "Hydrogen Storage Capacity of Carbon Nanotubes, Filaments, and Vapor-Grown Fibers", Carbon 39 (2001), pp. 2291-2301.
Cheng, et al., "Mechanism of Hydrogen Sorption in Single-Walled Carbon Nanotubes", J. Am. Chem. Soc. 2001, 123, pp. 5845-5846.

Simonyan, et al., "Hydrogen Storage in Carbon Nanotubes and Graphitic Nanofibers", Journal of Alloys and Compounds, 330-332 (2002), pp. 659-665.
Lueking et al., "Hydrogen Spillover From a Metal Oxide Catalyst onto Carbon Nanotubes—Implications for Hydrogen Storage", Journal of Catalysis 206 (2002), pp. 165-168.
Chambers et al., "Hydrogen Storage in Graphite Nanofibers", The Journal of Physical Chemistry B, vol. 102, No. 22, May 28, 1998, pp. 4253-4256.
Ahn et al., "Hydrogen Desorption and Adsorption Measurements on Graphite Nanofibers", Applied Physics Letters, vol. 73, No. 23, Dec. 7, 1998, pp. 3378-3380.
Park et al., "Further Studies of the Interaction of Hydrogen With Graphite Nanofibers", J. Phys. Chem. B, 1999, 103, pp. 10572-10581.
Gupta et al., "Further Studies on Microstructural Characterization and Hydrogenation on Behaviour of Graphite Nanofibers", Intl. J. of Hydrogen Energy 26 (2001), pp. 857-862.
Browning et al., "Studies into the Storage of Hydrogen in Carbon Nanofibers:Proposal of a Possible Reaction Mechanism", Nano Letters 2002, vol. 2, No. 3, pp. 201-205.
Lueking et al., "Hydrogen Storage in Graphite Nanofibers: Effect of Synthesis Catalyst and Pretreatment Conditions", Langmuir 2004, 20, pp. 714-721.
Chahine et al., "Low-Pressure Adsorption Storage of Hydrogen", Intl. J. Hydrogen Energy, vol. 19, No. 2 (1994), pp. 161-164.
Lamari et al., "Thermal Effects in Dynamic Storage of Hydrogen by Adsorption", Environmental and Energy Engineering, vol. 46, No. 3, Mar. 2000, pp. 632-646.
Orimo et al., "Hydrogen in the Mechanically Prepared Nanostructured Graphite", Applied Physics Letters, vol. 75, No. 20, Nov. 15, 1999, pp. 3093-3095.
Yang et al., "Ab Initio Molecular Orbital Study of Adsorption of Atomic Hydrogen on Graphite: Insight into Hydrogen Storage in Carbon Nanutubes", Carbon 40 (2002), pp. 437-444.
Khoobiar, S.,"Particle to Particle Migration of Hydrogen Atoms on Platinum-Alumina Catalysts From Particle to Neighboring Particles",Notes,vol. 68,No. 2, Feb. 1964, pp. 411-412. Sinfelt et al., "Kinetic Evidence for the Migration of Reactive Intermediates in Surface Catalysis",Migration of Intermediates in Surface Catalysis,Nov. 5, 1963, pp. 3365-3367.
Connor, Jr. et al., "Spillover in Heterogeneous Catalysis", Chem. Rev. 1995, 95, pp. 759-788.
Srinivas et al.,"Direct Observation of Hydrogen Spillover on Carbon-Supported Platinum and Its Influence on the Hydrogenation of Benzene",J. of Catalysis 148,(1994),pp. 470-477.
Lueking et al., "Hydrogen Spillover to Enhance Hydrogen Storage-Study of the Effect of Carbon Physicochemical Properties", Appl. Catalysis A: General 265 (2004), pp. 259-268.
Boudart, et al., "On the Slow Uptake of Hydrogen by Platinized Carbon", Journal of Catalysis 18 (1970), pp. 46-51.
Levy et al., "The Kinetics and Mechanism of Spillover", Journal of Catalysis 32 (1974), pp. 304-314.
Cassell, et al., "Large Scale CVD Synthesis of Single-Walled Carbon Nanotubes", J. Phys. Chem. B 1999, 103, pp. 6484-6492.
Goodell, P.D., "Stability of Rechargeable Hydriding Alloys During Extended Cycling", Journal of the Less-Common Metals, 99 (1984), pp. 1-14.

(Continued)

*Primary Examiner* — Stuart Hendrickson
(74) *Attorney, Agent, or Firm* — Dierker & Associates, P.C.

(57) ABSTRACT

A composition for hydrogen storage includes a receptor, a hydrogen dissociating metal doped on the receptor, and a metal salt doped on the receptor. The hydrogen dissociating metal is configured to spill over hydrogen to the receptor, and the metal salt is configured to increase a rate of the spill over of the hydrogen to the receptor.

11 Claims, 6 Drawing Sheets

OTHER PUBLICATIONS

Zhou, et al., "Linearization of Adsorption Isotherms for High-Pressure Applications", Chemical Engineering Science, vol. 53, No. 14 (1998), pp. 2531-2536.

Benson et al., "Hydrogen-Oxygen Titration Method for the Measurement of Supported Platinum Surface Areas", Journal of Catalysis 4 (1965), pp. 704-710.

Li, et al., "Hydrogen Storage in Metal—Organic Frameworks by Bridged Hydrogen Spillover", J. Am. Chem. Soc., Published on Web Jun. 2, 2006.

Yang et al., "Adsorption of Spillover Hydrogen Atoms on Single-Wall Carbon Nanotubes", J. Phys. Chem. B, Published on Web Mar. 2, 2006, 110, pp. 6236-6244.

Cote, Adrien P. et al. "Porous, Cyrstalline, Covalent Organic Frameworks", Science, vol. 310, Nov. 18, 2005, pp. 1166-1170.

International Search Report for S.N. PCT/US2006/021509 dated Oct. 5, 2007 (3 pages).

International Preliminary Report on Patentability for S.N. PCT/US2006/021509 dated Apr. 24, 2008 (5 pages).

* cited by examiner

US 8,426,337 B2

METAL SALT CATALYSTS FOR ENHANCING HYDROGEN SPILLOVER

CROSS REFERENCE TO RELATED APPLICATIONS

This application is a continuation-in-part of U.S. patent application Ser. No. 11/442,898, filed May 30, 2006, which itself claims the benefit of U.S. Provisional Patent Application Ser. No. 60/725,337 filed on Oct. 11, 2005, and U.S. Provisional Patent Application Ser. No. 60/751,744 filed on Dec. 19, 2005, the contents of each of which are incorporated herein by reference.

STATEMENT REGARDING FEDERALLY SPONSORED RESEARCH OR DEVELOPMENT

This invention was made in the course of research partially supported by grants from the U.S. Department of Energy (DOE) (Grant No. DE-FC36-05-GO15078) and from the National Science Foundation (NSF) (Grant No. CBET-0753008). The U.S. government has certain rights in the invention.

BACKGROUND

The present disclosure relates generally to hydrogen storage, and more particularly to compositions for enhancing hydrogen spillover, and thus for enhancing hydrogen storage.

The U.S. Department of Energy (DOE) has established a multi-stage target for hydrogen storage capacity in materials, for example, those materials intended for fuel cell applications. The targets for on-board hydrogen storage materials are about 2 kW/kg (6 wt %) by 2010, and about 3 kW/kg (9 wt %) by 2015.

In attempts to meet the DOE targets, nanostructured carbon materials (e.g., carbon nanotubes, graphite nanofibers, activated carbon, and graphite) have become of interest to researchers as potential hydrogen adsorbents. However, it has been shown that nanostructured carbons (in particular, carbon nanotubes) have slow uptake, irreversibly adsorbed species, and the presence of reduced transition metals.

Experimental evidence, combined with ab initio molecular orbital calculations of hydrogen atoms on graphite, has led to the proposal of a mechanism for hydrogen storage in carbon nanostructures involving hydrogen dissociation on metal particles followed by atomic hydrogen spillover and adsorption on the nanostructured carbon surface.

SUMMARY

A composition for hydrogen storage is disclosed herein. The composition includes a receptor, a hydrogen dissociating metal doped on the receptor, and a metal salt doped on the receptor. The hydrogen dissociating metal is configured to spill over hydrogen to the receptor, and the metal salt is configured to increase a rate of the spill over of the hydrogen to the receptor.

BRIEF DESCRIPTION OF THE DRAWINGS

Features and advantages of embodiments of the present disclosure will become apparent by reference to the following detailed description and drawings.

DETAILED DESCRIPTION

The mechanistic details of hydrogen spillover involve the dissociative chemisorption of $H_2$ on a metal and subsequent migration or surface diffusion of the atomic hydrogen onto support surfaces. Embodiments of the composition disclosed herein advantageously increase the rate of hydrogen spillover via the addition of a metal salt catalyst to the support surface. It is believed that the rate of hydrogen spillover, and thus the rate of adsorption, may advantageously be doubled compared to the rate of hydrogen spillover and adsorption for a similar metal doped surface not including the metal salt catalyst. The increase in the rate of adsorption and desorption may be as much as 500%. Without being bound to any theory, it is believed that the metal salt catalyzes the surface diffusion of hydrogen atoms on the support surface.

Figure 1:
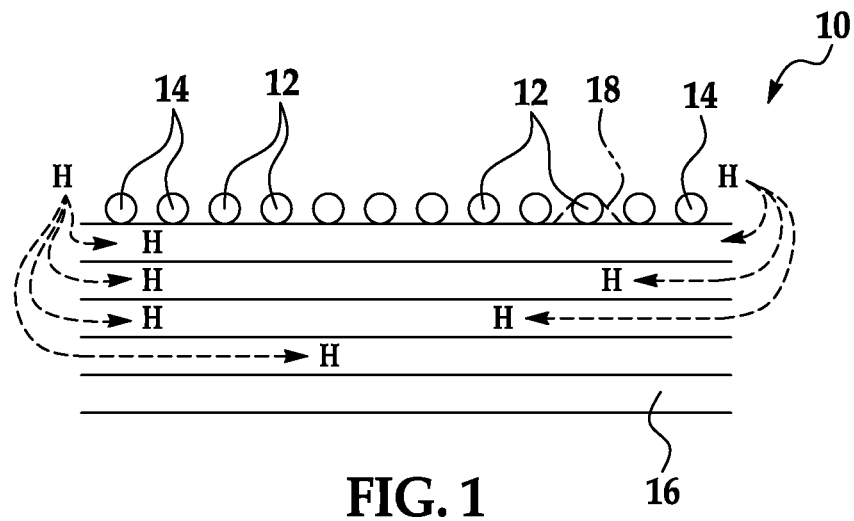
FIG. 1 is a schematic view of an embodiment of the composition.

Referring now to FIG. 1, an embodiment of the composition 10 is illustrated. The composition includes a metal salt 12, a hydrogen dissociating metal 14 and a receptor 16. In this embodiment, the hydrogen dissociating metal 14 is doped on a surface of the receptor 16. Non-limitative examples of metals 14 that may be doped on the receptor 16 surface include platinum, palladium, ruthenium, rhodium, nickel, copper, tungsten, iron, or the like, or combinations thereof. The transport of hydrogen atoms from the metal 14 to the receptor 16 is referred to as hydrogen spillover.

The addition of the metal salt 12 to the composition 10 has significant catalytic effects on the hydrogen spillover. These metal salt catalysts 12 speed up the spillover rates for both charge and discharge of hydrogen. The cation portion of the metal salt 12 may be selected from transition metals or rare earth metals, while the anion portion of the metal salt 12 may be selected from halides or oxides. Non-limiting examples of suitable metal salts 12 include chlorides or oxides of any of Ti, V, Zr, Fe, Mn, Cr, Co, or Nd.

The receptor 16 is adapted to receive hydrogen atoms that spill over from the hydrogen dissociating metal 14. In an embodiment, the receptor 16 may be any suitable porous and/or microporous material, including activated carbons, super-activated carbon, carbon nanotubes (a non-limitative example of which includes single-wall carbon nanotubes (SWNT)), carbon nanofibers, molecular sieves, silica gel, alumina, zeolites, metal-organic framework (MOF) materials, covalent organic framework (COF) materials; and combinations thereof. A non-limitative embodiment of super-activated carbon includes AX-21 super-activated carbon, which is commercially available from Anderson Development Co. located in Adrian, Mich. In a non-limitative embodiment, the zeolites are selected from zeolite X, zeolite Y, zeolite LSX, MCM-41 zeolites, silicoaluminophosphates (SAPOs), and combinations thereof.

Non-limitative examples of metal-organic frameworks include MOF-5, MOF-8 (the terms "MOF-8" and "IRMOF-8" (iso-reticular MOF-8) are used interchangeably herein), IRMOF-177, and/or the like, and/or combinations thereof, which are constructed by linking tetrahedral clusters with linear carboxylates.

In an alternate embodiment, it is to be understood that porous, crystalline, covalent organic framework (COF) materials may be used as the receptor 16. COFs are formed from light elements (e.g., H, B, C, N, and O) that form strong covalent bonds in materials such as diamond, graphite, and boron nitride. COFs may be micro- and mesoporous crystalline structures. These COF materials have substantially rigid structures, excellent thermal stabilities (to temperatures up to about 600° C.), and relatively low densities. Further, these materials exhibit permanent porosity with specific surface areas substantially surpassing those of well-known zeolites and porous silicates. Yet further, it has been found that COF materials generally do not adsorb water vapor, and thus may be more stable than MOF materials when used as the receptor 16 in embodiment(s) of the present disclosure. In a non-limitative embodiment, the COF materials are selected from COF-1 [$(C_3H_2BO)_6.(C_9H_{12})_1$], COF-5 ($C_9H_4BO_2$), and combinations thereof. The synthesis and crystallization of suitable COF materials is described by Côté et al., "Porous, Crystalline, Covalent Organic Frameworks," *Science*, Vol. 310, pages 1166-1170 (Nov. 18, 2005).

It is to be understood that chemical bridges 18 (shown in phantom in FIG. 1) may or may not be part of the composition 10. Such chemical bridges 18 may be formed between the hydrogen dissociating metal 14 and the receptor 16, and/or between the metal salt 12 and the receptor 16, and/or between the metal salt 12 and the hydrogen dissociating metal 14. In the embodiment shown in FIG. 1, the chemical bridges 18 are generally formed at the interstices between the hydrogen dissociating metal 14 and the receptor 16 and at the interstices between the metal salt 12 and the receptor 16. Without being bound to any theory, it is believed that the chemical bridges 18 may enhance the hydrogen adsorption amount by a factor ranging from about 1.5 to about 10.0 at 298 K and at 100 kPa or at 10 MPa, depending, at least in part, on the receptor 16 selected. The chemical bridges 18 may be carbon bridges, boron bridges, phosphorus bridges, sulfur bridges, and/or combinations thereof.

The composition 10 may be formed by co-doping the hydrogen dissociating metal 14 and the metal salt 12 on the receptor 16 surface, or by sequentially doping the receptor surface 16 with the hydrogen dissociating metal 14 and then with the metal salt 12. Either method results in the composition 10 having increased rates of hydrogen adsorption and desorption.

The amount of metal salt 12 used to dope the receptor 16 ranges from about 0.1 wt % to about 10 wt %. As will be discussed further hereinbelow, 2 wt % has been found to nearly double the rates for both adsorption and desorption.

During the co-doping method, the receptor 16 is exposed to a solution containing both the hydrogen dissociating metal 14 and the metal salt 12. In one non-limiting example, an ether solution containing the hydrogen dissociating metal 14 and the metal salt 12 may be used to co-dope the receptor 16. Other suitable solvents that may be used for co-doping include water or dimethylformamide (DMF). For co-doping, the receptor 16 is exposed to the desirable solution for a predetermined time and at a predetermined temperature. It is to be understood that the conditions will depend, at least in part, on the receptor 16, the hydrogen dissociating metal 14, and the metal salt 12 used.

During the sequential doping method, the metal salt 12 is doped after the hydrogen dissociating metal 14 is doped on the receptor 16. An incipient wetness impregnation may be used to dope the receptor 16 with the metal salt 12. In one non-limiting example, platinum nanoparticles (i.e., the hydrogen dissociating metal 14) are doped on AX-21 carbon (i.e., the receptor 16) using a solution of $H_2PtCl_6$ in acetone. This doping process may be aided by ultrasonication, followed by drying and reduction in $H_2$ at about 300° C. for a predetermined time. 2 wt % of $TiCl_3$ or $VCl_3$ (i.e., the metal salt 12) is then doped on the Pt/AX-21 via incipient wetness impregnation using solution in diethyl ether. The solvent is evaporated at a predetermined temperature for a predetermined time (e.g., 50° C. for 2 hours). The dried, doped receptor 16 may also be exposed to heat-treatment by degassing.

In an embodiment in which it is desirable to also form the chemical bridge 18, it is to be understood that a precursor material for such a bridge 18 is added to the mixture of the metal salt 12, hydrogen dissociating metal 14, and receptor 16. In an embodiment, a hydrocarbon, carbon, boron, phosphorus, sulfur, and/or compounds thereof, and/or combinations thereof (e.g., carbon/boron) precursor material is added to the mixture. It is to be understood that the precursor material may be in a solid form, a liquid form, or combinations thereof, as desired and/or as suitable for a particular application. In one non-limitative example, the precursor material is a solid at room temperature, examples of which include, but are not limited to sugars (non-limitative examples of which include reagent grade D-glucose, dextrose, and sucrose), polymers (a non-limitative example of which includes polystyrenes, polyvinyl alcohol, or the like), surfactants, cellulosic resins (such as ethylcellulose resin, urea-formaldehyde resin, etc.), and/or the like, and/or combinations thereof. In a further non-limitative embodiment, the precursor is a liquid, an example of which includes, but is not limited to coal tar pitch and petroleum based pitch.

The metal salt 12/hydrogen dissociating metal 14/receptor 16/precursor mixture may be heated using a programmed temperature change process. The temperature program may be dependent upon the precursor used. In an embodiment incorporating a precursor material that is solid at room temperature, heating may be accomplished at a temperature greater than the melting temperature of the solid precursor. Certain temperatures melt the precursor so that it substantially fills the interstices between the hydrogen dissociating metal 14 and the receptor 16, between the metal salt 12 and the receptor 16, and in some instances, between the metal salt 12 and the hydrogen dissociating metal 14. Increased temperatures (i.e., higher than the melt temperature) at least partially convert (i.e., carbonize, boronize, phosphorize, sulfurize, or combinations thereof) the precursor to a predetermined element by pyrolysis to form the chemical bridges 18. In a non-limitative example using glucose as the precursor, the melting temperature is about 160° C., and the increased temperature (e.g., the carbonization temperature) is about 400° C.

In an embodiment incorporating a liquid bridge precursor material, the method may include heating the mixture to a predetermined temperature (e.g., similar to the increased temperatures previously described) that is sufficient to subject the precursor material to at least partial: carbonization; boronization; phosphorization; sulfurization; or combinations thereof.

It is to be understood that the increased temperatures may partially or substantially fully convert the precursor to carbon, boron, phosphorus, sulfur, and/or compounds thereof, and/or combinations thereof (depending, at least in part, on the precursor selected). As such, the resulting chemical bridge 18 may be partially or substantially fully carbonized, boronized, phosphorized, sulfurized, and/or combinations thereof.

The composition 10 may be substantially fully reversible through desorption and re-adsorption at about 298 K. Without being bound to any theory, it is believed that the release of hydrogen at room temperature is possible because the bond energy is low enough to desorb. In an embodiment, desorption at 298 K may take place in a vacuum (about 1 Pa) for a predetermined time (e.g., a time ranging from about 1 minute to about 10 hours). It is to be understood that the predetermined time may depend, at least in part, on the amount of hydrogen to be desorbed. In another embodiment, desorption may be accomplished by heating the composition 10 at a temperature ranging from about 298K to about 423 K.

Without being bound to any theory, it is believed that molecular hydrogen may also be desorbed from the receptor 16 of the composition 10 upon depressurization. In this embodiment, it is believed that hydrogen atoms on the interior sites of the receptor 16 desorb first. The binding energies on these interior sites are relatively low (e.g., on the order of 10-15 kcal/mol), and the adsorbed hydrogen atoms are mobile. As such, an interior-exterior exchange is possible, and the interior sites substantially continuously serve as the sites to which hydrogen atoms migrate and from which hydrogen is desorbed as molecular hydrogen.

To further illustrate embodiment(s) of the present disclosure, various examples are given herein. It is to be understood that these examples are provided for illustrative purposes and are not to be construed as limiting the scope of the disclosed embodiment(s).

EXAMPLES

Preparation of Pt/AX-21

200 mg of well-dried superactivated carbon (AX-21 carbon, BET surface area=2800 m$^2$/g) was dispersed in 20 mL of acetone and was stirred for 0.5 hours in a 125 mL Erlenmeyer flask at room temperature. A 2.0 mL acetone solution containing 26 mg H$_2$PtCl$_6$ (Aldrich, 99.9%) was slowly added dropwise to the AX-21 carbon solution under vigorous agitation for about 10 minutes. The Erlenmeyer flask containing the slurry was subjected to ultrasonication at room temperature for 1 hour and was then magnetically stirred at room temperature for 24 hour. After being dried in an oven at 60° C. overnight to evaporate most of the acetone solvent, the impregnated carbon sample was transferred to a quartz boat, which was slid into a horizontal quartz tube. The sample was further dried in a He flow at 120° C. for 2 hours to remove residual acetone and the moisture adsorbed on the sample. Then the He flow was switched to H$_2$, and the temperature was increased to 300° C. at a heating rate of 1° C./minute. This temperature was held for 2 hours. After slowly cooling to room temperature in H$_2$, the sample was purged with flowing He for at least 2 hours, and was stored under He atmosphere before further use. The prepared Pt/AX-21 contained 6.0 wt % of Pt.

Doping the Pt/AX-21 with Chlorides

In these examples, doping of TiCl$_3$ or VCl$_3$ was performed sequentially, i.e., the metal salt was doped after Pt nanoparticles were doped on AX-21 carbon (as described above).

An incipient-wetness method was used for the preparation of Pt/AX-21 doped with Ti and V chlorides. 4.0 mg of TiCl$_3$ or VCl$_3$ (Aldrich) was added to 3 mL of diethyl ether solution, and was stirred for 1 hour. After the chloride was dissolved, 200 mg of Pt/AX-21 sample, which was first degassed at 350° C. for 5 hours, was added to the chloride solution. After volatilization of the diethyl ether at room temperature, the sample was dried in flowing helium at 50° C. for 2 hour. Before use, the samples were degassed at 200° C. for 12 hours.

The BET surface areas of these samples and the Pt/AX-21 sample are given in Table 1. They were measured by N$_2$ adsorption at −196° C. using Micromeritics ASAP 2020. The same system was also used for measuring low pressure H$_2$ isotherms at <1 atm as well as rates of uptake at different temperatures.

TABLE 1

Pt/AX-21 and catalyst-doped Pt/AX-21, and activation energy for spillover (ΔE) during a pressure increase step

| Sample | BET S.A. (m$^2$/g) | Pressure step (mmHg) | ΔE (kJ/mol) |
| --- | --- | --- | --- |
| Pt/AX-21 | 2521 | 65.0-74.0 | 7.5 |
| Pt/AX-21 + TiCl$_3$ | 2501 | 65.0-71.0 | 6.5 |
| Pt/AX-21 + VCl$_3$ | 2498 | 67.0-74.0 | 6.8 |

Co-doping Pt and Ti on AX-21

A co-doped sample was also prepared for $TiCl_3$. The preparation procedure of the co-doped sample, denoted as Ti—Pt/AX-21, was similar to that of Pt/AX-21. 2.0 wt % of $TiCl_3$ (Aldrich, 99.995%) based on the weight of AX-21 was added to the $H_2PtCl_6$ solution used to prepare the Pt/AX-21 sample. In addition, the solvent acetone was also replaced with ether.

Measurements, Results, and Discussion

The high pressure $H_2$ isotherms and rates for both adsorption and desorption were measured with a Sievert's apparatus. The apparatus was previously tested to prove to be leak-free and proven for accuracy through calibration by using $LaNi_5$ and AX-21 at 25° C. During this test, all isotherms matched the known values. Prior to measurements, the samples were degassed at 350° C. for at least 12 hours.

Hydrogen adsorption at 25° C. and a pressure in the range of 1.0 atm-100 atm was measured using a static volume technique.

Figure 2:
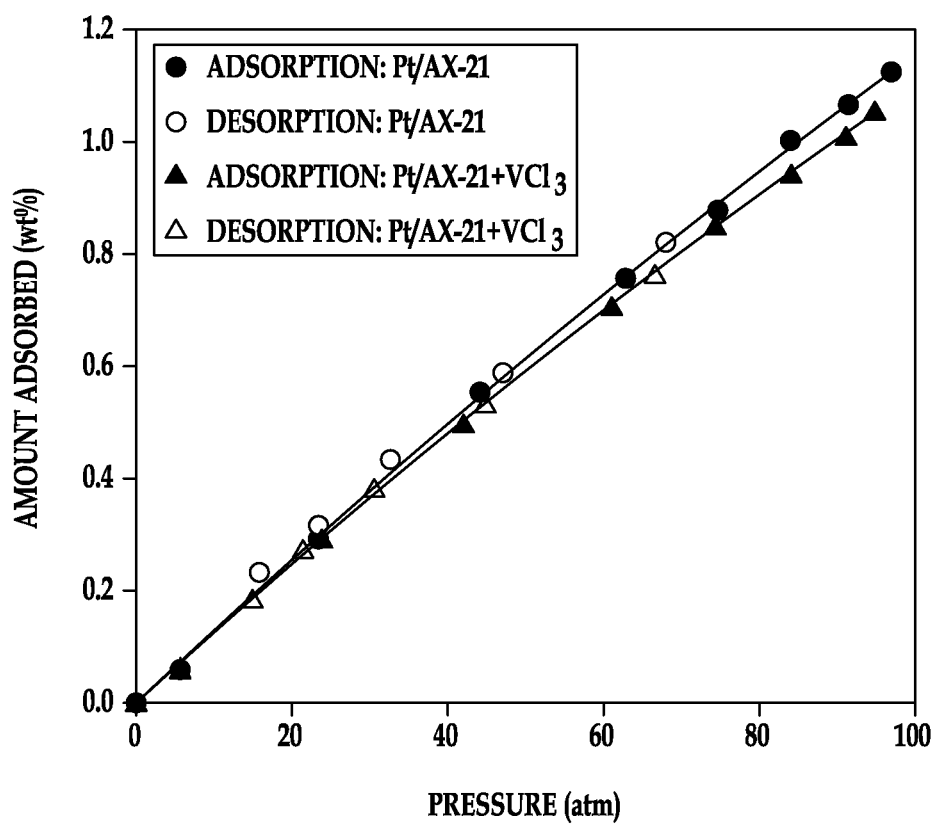
FIG. 2 is a graph depicting the isotherms of $H_2$ adsorption and desorption on Pt/AX-21 (i.e., a platinum doped superactive carbon) and Pt/AX-21 subsequently doped with $VCl_3$ (i.e., Pt/AX-21+$VCl_3$)
Figure 3:
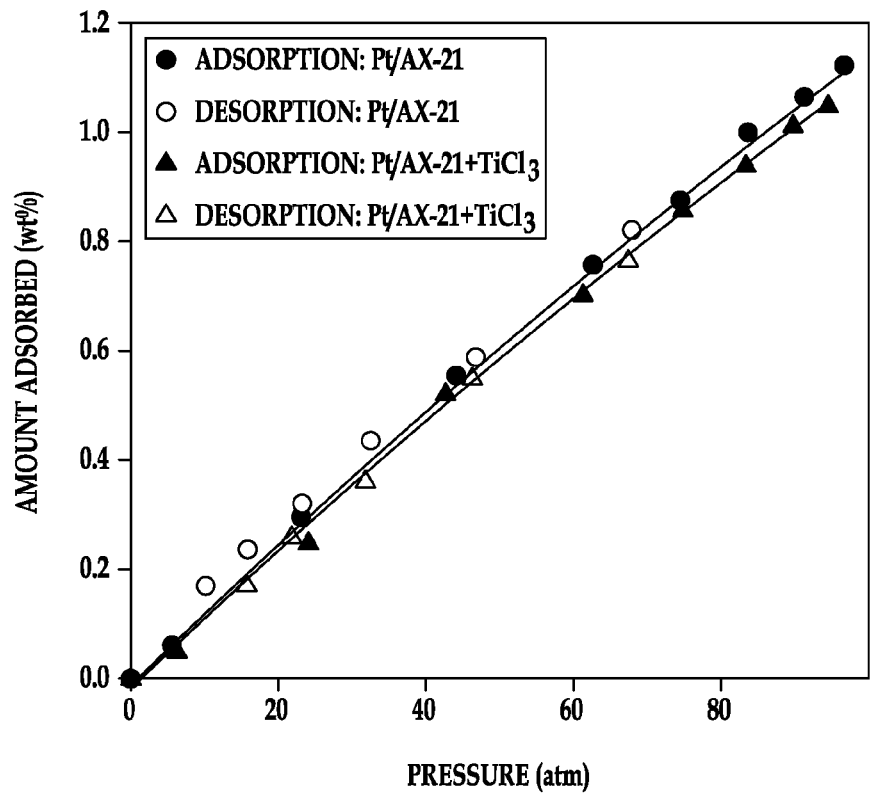
FIG. 3 is a graph depicting the isotherms of $H_2$ adsorption/desorption on Pt/AX-21 and Pt/AX-21 subsequently doped with (i.e., Pt/AX-21+$TiCl_3$)

The isotherms of $H_2$ adsorption/desorption on Pt/AX-21 and Pt/AX-21+$VCl_3$ at 25° C. are shown in FIG. 2. The isotherms of $H_2$ adsorption/desorption on Pt/AX-21 and Pt/AX-21+$TiCl_3$ at 25° C. are shown in FIG. 3. For both the $TiCl_3$ and $VCl_3$ doped samples, the isotherms were lowered slightly, reflecting the slight reduction in its surface area due to doping. The desorption branches are also shown. Interestingly, the small hysteresis loops for Pt/AX-21 disappeared upon doping of $TiCl_3$ or $VCl_3$.

Figure 4:
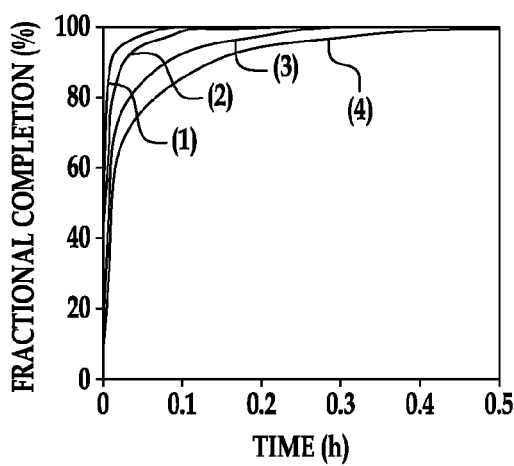
FIG. 4 is a graph depicting the rate of $H_2$ adsorption on Pt/AX-21 and Pt/AX-21+$TiCl_3$ at 25° C. and at different pressure steps, where the pressure steps were as follows: (1) 0-6.1 atm $H_2$ on Pt/AX-21+$TiCl_3$, (2) 0-5.7 atm $H_2$ on Pt/AX-21, (3) 6.1-24.0 atm $H_2$ on Pt/AX-21+$TiCl_3$ and (4) 5.7-23.5 atm $H_2$ on Pt/AX-21.
Figure 5:
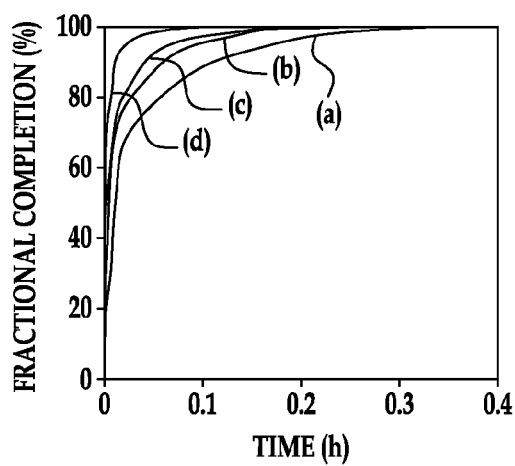
FIG. 5 is a graph depicting the rate of $H_2$ desorption on Pt/AX-21 and Pt/AX-21+$TiCl_3$ at 25° C. and at different pressure steps, where the pressure steps were as follows: (a) 32.8-23.5 atm for Pt/AX-21, (b) 31.9-21.9 atm for Pt/AX-21+TiCl3, (c) 23.5-15.9 atm for Pt/AX-21 and (d) 21.9-15.7 atm for Pt/AX-21+TiCl3.

The uptake rates for both low pressure range (<1 atm) and high pressure range (>1 atm) were significantly increased upon doping with 2 wt % $TiCl_3$. The high pressure adsorption data are shown in FIG. 4. The desorption rates are shown in FIG. 5. Again, by doping 2 wt % $TiCl_3$, the rates were significantly increased. The rates of both adsorption and desorption decreased at higher hydrogen loading, as seen here for all samples. Moreover, the desorption rates were higher than that of adsorption, as also seen here.

Figure 6A:
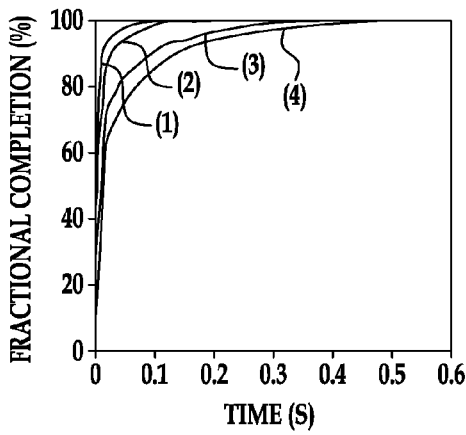
FIG. 6A is a graph depicting the rate of $H_2$ adsorption on Pt/AX-21 and Pt/AX-21+$VCl_3$ at 25° C. and at different pressure steps, where the pressure steps were as follows: (1) 0-5.8 atm $H_2$ on Pt/AX-21+$VCl_3$, (2) 0-5.7 atm $H_2$ on Pt/AX-21, (3) 5.8-23.8 atm $H_2$ on Pt/AX-21+$VCl_3$ and (4) 5.7-23.5 atm $H_2$ on Pt/AX-21.
Figure 6B:
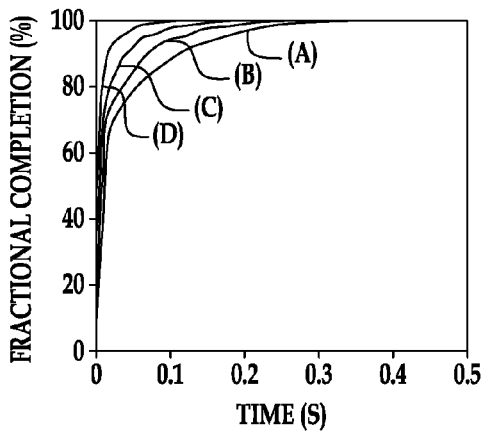
FIG. 6B is a graph depicting the rate of $H_2$ desorption from Pt/AX-21 and Pt/AX-21+$VCl_3$ at 25° C. a and at different pressure steps, where the pressure steps were as follows: (A) 32.8-23.5 atm for Pt/AX-21, (B) 30.6-21.4 atm for Pt/AX-21+$VCl_3$, (C) 23.5-15.9 atm for Pt/AX-21 and (D) 21.4-15.0 atm for Pt/AX-21+$VCl_3$.

The rates of both adsorption and desorption for the $VCl_3$ doped sample are compared with that of Pt/AX-21 in FIGS. 6A and 6B, respectively. Here, again, the significant catalytic effects of the metal salts are clearly seen.

Figure 7:
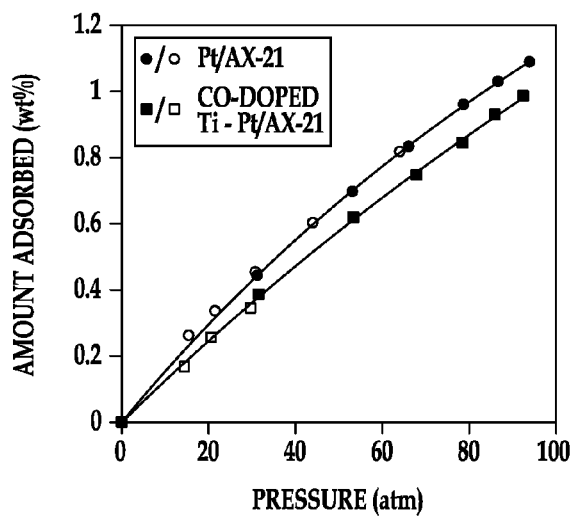
FIG. 7 is graph depicting the isotherms of $H_2$ adsorption and desorption on Pt/AX-21 (●/○) and co-doped Ti—Pt/AX-21 (■/□) at 25° C.
Figure 8:
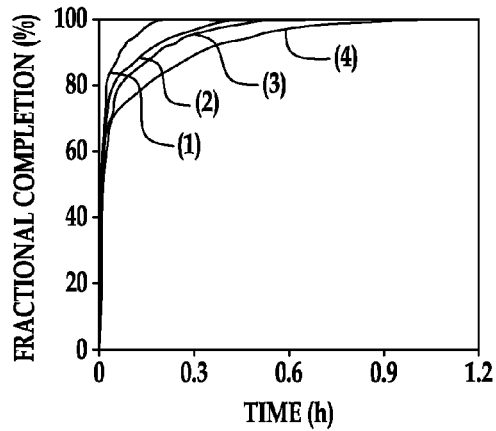
FIG. 8 is a graph depicting the rate of $H_2$ adsorption on Pt/AX-21 and co-doped Ti—Pt/AX-21 at 25° C. and at different pressure steps, where the pressure steps were as follows: (1) 0-31.5 atm $H_2$ on co-doped Ti—Pt/AX-21, (2) 0-31.3 atm $H_2$ on Pt/AX-21, (3) 31.5-53.4 atm $H_2$ on co-doped Ti—Pt/AX-21 and (4) 31.3-53.1 atm $H_2$ on Pt/AX-21.
Figure 9:
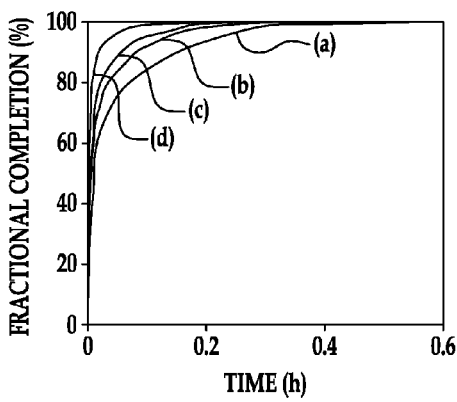
FIG. 9 is a graph depicting the rate of $H_2$ desorption from Pt/AX-21 and co-doped Ti—Pt/AX-21 at 25° C. and at different pressure steps, where the pressure steps were as follows: (a) 64.1-44.2 atm $H_2$ from Pt/AX-21, (b) 63.2-43.2 atm $H_2$ from co-doped Ti—Pt/AX-21, (c) 44.2-30.8 atm $H_2$ from Pt/AX-21 and (d) 43.2-29.8 atm $H_2$ from co-doped Ti—Pt/AX-21.

The isotherms for the co-doped Ti—Pt/AX-21 are shown in FIG. 7. The rates of adsorption and desorption are shown in, respectively, FIGS. 8 and 9. The rates were significantly increased by doping with 2 wt % $TiCl_3$.

The rate limiting step for the spillover process on the samples discussed in these Examples and similar samples at near ambient temperature is surface diffusion on carbon, where H atoms are the diffusing species. Thus, the surface diffusion process is catalyzed via the doping of $TiCl_3$ and $VCl_3$.

In order to understand the catalytic mechanism, heats of adsorption and activation energies ($\Delta E$) for surface diffusion (via spillover rates) were determined for all of the subsequently doped samples (i.e., not for the co-doped sample). The overall heats of adsorption were determined from the temperature dependence of the isotherms, via the Clausius-Clapeyron equation; while the $\Delta E$ values for spillover were determined from the temperature dependence of the uptake rates.

Figure 10:
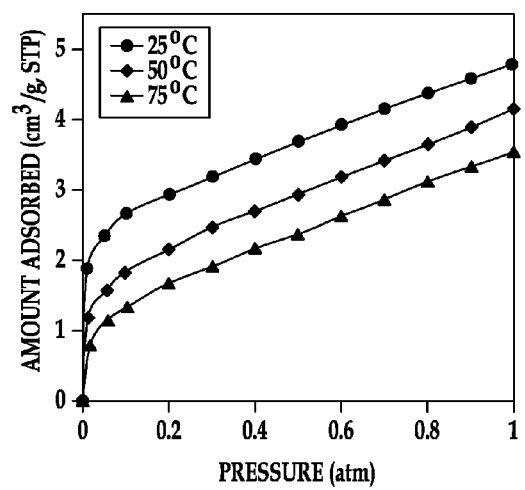
FIG. 10 is a graph depicting the $H_2$ adsorption isotherms on the Pt/AX-21 at different temperatures.
Figure 11:
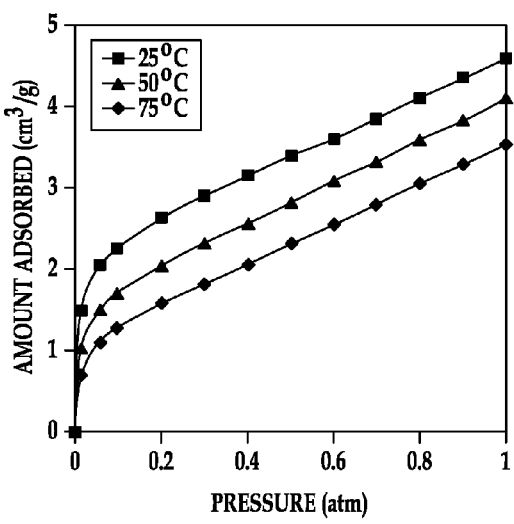
FIG. 11 is a graph depicting the $H_2$ adsorption isotherms, at different temperatures, on Pt/AX-21+$TiCl_3$.
Figure 12:
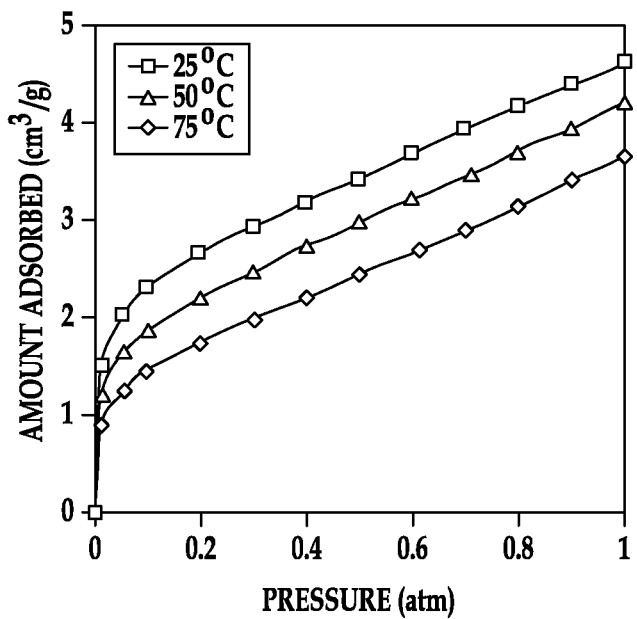
FIG. 12 is a graph depicting isotherms of $H_2$ adsorption on Pt/AX-21+$VCl_3$ at different temperatures.
Figure 13:
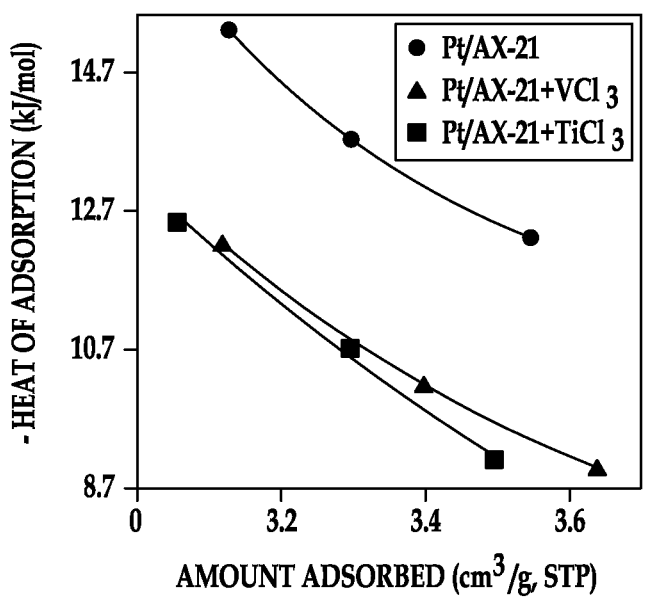
FIG. 13 is a graph depicting the overall isosteric (exothermic) heats of adsorption for Pt/AX-21, Pt/AX-21+$TiCl_3$, and Pt/AX-21+$VCl_3$.

The isoteric heats of adsorption were calculated from the temperature dependence of the low pressure isotherms. The isotherms are shown in FIGS. 10, 11 and 12 for, respectively, Pt/AX-21, Pt/AX-21+$TiCl_3$ and Pt/AX-21+$VCl_3$. The results on the heats of adsorption are shown in FIG. 13.

Figure 14:
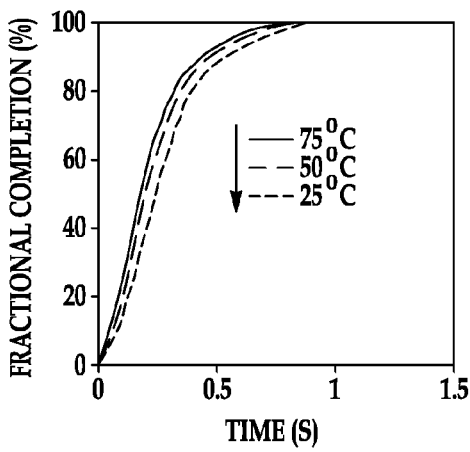
FIG. 14 is a graph depicting the kinetics of $H_2$ adsorption on Pt/AX-21 at 65.0-74.0 mmHg $H_2$ and at different temperatures.
Figure 15:
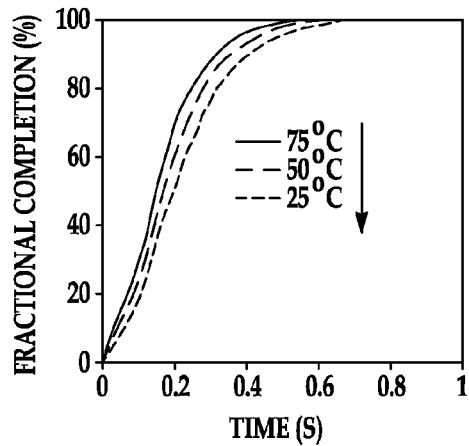
FIG. 15 is a graph depicting the kinetics of $H_2$ adsorption on Pt/AX-21+$TiCl_3$ at 65.0-71.0 mmHg $H_2$ and at different temperatures.
Figure 16:
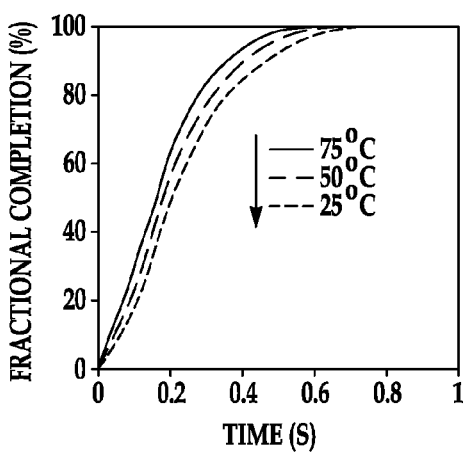
FIG. 16 is a graph depicting the kinetics of $H_2$ adsorption on Pt/AX-21+$VCl_3$ at 67.0-74.0 mmHg $H_2$ and at different temperatures.

The activation energies for spillover were obtained from the temperature dependence of spillover rates (i.e., uptake rates), via the Arrhenius equation. The uptake rates at different temperatures are shown in FIGS. 14, 15 and 16. From the rate data, the surface diffusion time constants, $D/R^2$, were first estimated. Here, D is surface diffusivity and R is an average radius of diffusion for spillover. Plots of $\log(D/R^2)$ vs. $1/T$ yielded the activation energies, and AE values are given in Table 1 (above).

Both heats of adsorption and AE for spillover were lowered significantly by doping of $TiCl_3$ and $VCl_3$. This result indicates that the binding energies between the spilled over H and the sites on carbon surfaces were weakened by doping. The activation energy for surface diffusion is typically a fraction of the binding energy. As such, a decrease in the binding energy would result in lowering of the activation energy, and would consequently lead to higher diffusion rates.

It is further believed that the catalytic effects observed for spillover in the embodiments disclosed herein are unrelated to that for metal hydrides.

While several embodiments have been described in detail, it will be apparent to those skilled in the art that the disclosed embodiments may be modified. Therefore, the foregoing description is to be considered exemplary rather than limiting.

What is claimed is:

1. A composition for hydrogen storage, comprising:
   an active carbon receptor;
   a hydrogen dissociating metal doped on the active carbon receptor, the hydrogen dissociating metal configured to spill over hydrogen to the active carbon receptor, the hydrogen dissociating metal being platinum; and
   a metal salt doped on the receptor, the metal salt configured to increase the rate of spill over of the hydrogen to the receptor, the metal salt being a titanium halide.

2. The composition as defined in claim 1 wherein chemical bridges are not formed between i) the hydrogen dissociating metal and the receptor, and ii) the metal salt and the hydrogen dissociating metal, the chemical bridge being selected from carbon bridges, boron bridges, phosphorus bridges, sulfur bridges, bridges formed of compounds thereof, and combinations thereof.

3. A composition for hydrogen storage, comprising:
   an active carbon receptor;
   a hydrogen dissociating metal doped on the active carbon receptor, the hydrogen dissociating metal configured to spill over hydrogen to the active carbon receptor, the hydrogen dissociating metal being platinum; and
   a metal salt doped on the receptor, the metal salt configured to increase the rate of spill over of the hydrogen to the receptor, the metal salt being a titanium halide or an iron halide; and
   a chemical bridge formed between i) the hydrogen dissociating metal and the receptor, and ii) the metal salt and the hydrogen dissociating metal, the chemical bridges being selected from carbon bridges, boron bridges, phosphorus bridges, sulfur bridges, bridges formed of compounds thereof, and combinations thereof.

4. A composition for hydrogen storage, consisting essentially of:
   a receptor;
   a hydrogen dissociating metal doped on the receptor, the hydrogen dissociating metal configured to spill over hydrogen to the receptor, the hydrogen dissociating metal being selected from the group consisting of platinum, palladium, ruthenium, rhodium, nickel, copper, tungsten, and iron; and
   a metal salt doped on the receptor, the metal salt configured to increase the rate of spill over of the hydrogen to the receptor, the metal salt being a halide or an oxide of a metal selected from the group consisting of titanium, vanadium, zirconium, iron, manganese, chromium, cobalt, and neodymium.

5. A method for increasing rates of hydrogen adsorption and desorption, comprising:
   doping an active carbon receptor with a hydrogen dissociating metal that is configured to spill over hydrogen to the active carbon receptor, the hydrogen dissociating metal being platinum;
   doping the receptor with a metal salt configured to increase the rate of spill over of the hydrogen to the receptor, the metal salt being a titanium halide or an iron halide; and
   forming a chemical bridge between i) the hydrogen dissociating metal and the receptor, and ii) the metal salt and the hydrogen dissociating metal, the chemical bridges being selected from carbon bridges, boron bridges, phosphorus bridges, sulfur bridges, bridges formed of compounds thereof, and combinations thereof.

6. The method as defined in claim 5 wherein forming the chemical bridge is accomplished by:
   forming a mixture of the hydrogen dissociating metal and the receptor;
   adding the metal salt to the mixture;
   adding a precursor material to the mixture; and
   heating the mixture having the hydrogen dissociating metal, the metal salt and the precursor material therein, thereby forming the chemical bridge between i) the hydrogen dissociating metal and the receptor, and ii) the metal salt and the hydrogen dissociating metal.

7. The method as defined in claim 5 wherein doping the receptor with the metal salt is accomplished via an incipient-wetness method.

8. The method as defined in claim 5 wherein the doping steps are accomplished simultaneously.

9. The method as defined in claim 5 wherein doping the receptor with the hydrogen dissociating metal is accomplished prior to doping the receptor with the metal salt.

10. The method as defined in claim 5 wherein an amount of metal salt doped on the receptor ranges from 0.1 wt % to about 10 wt %.

11. The method as defined in claim 5 wherein a rate of adsorption and a rate of desorption of hydrogen via the receptor doped with the hydrogen dissociating metal and the metal salt is enhanced by up to 500% compared to a rate of adsorption and desorption of hydrogen via a receptor doped with the hydrogen dissociating metal and without the metal salt.

* * * * *